July 21, 1970  E. RATH  3,521,459
METHOD FOR STORING AND TRANSPORTING FOOD IN A FRESH CONDITION
Filed June 21, 1968  3 Sheets-Sheet 1
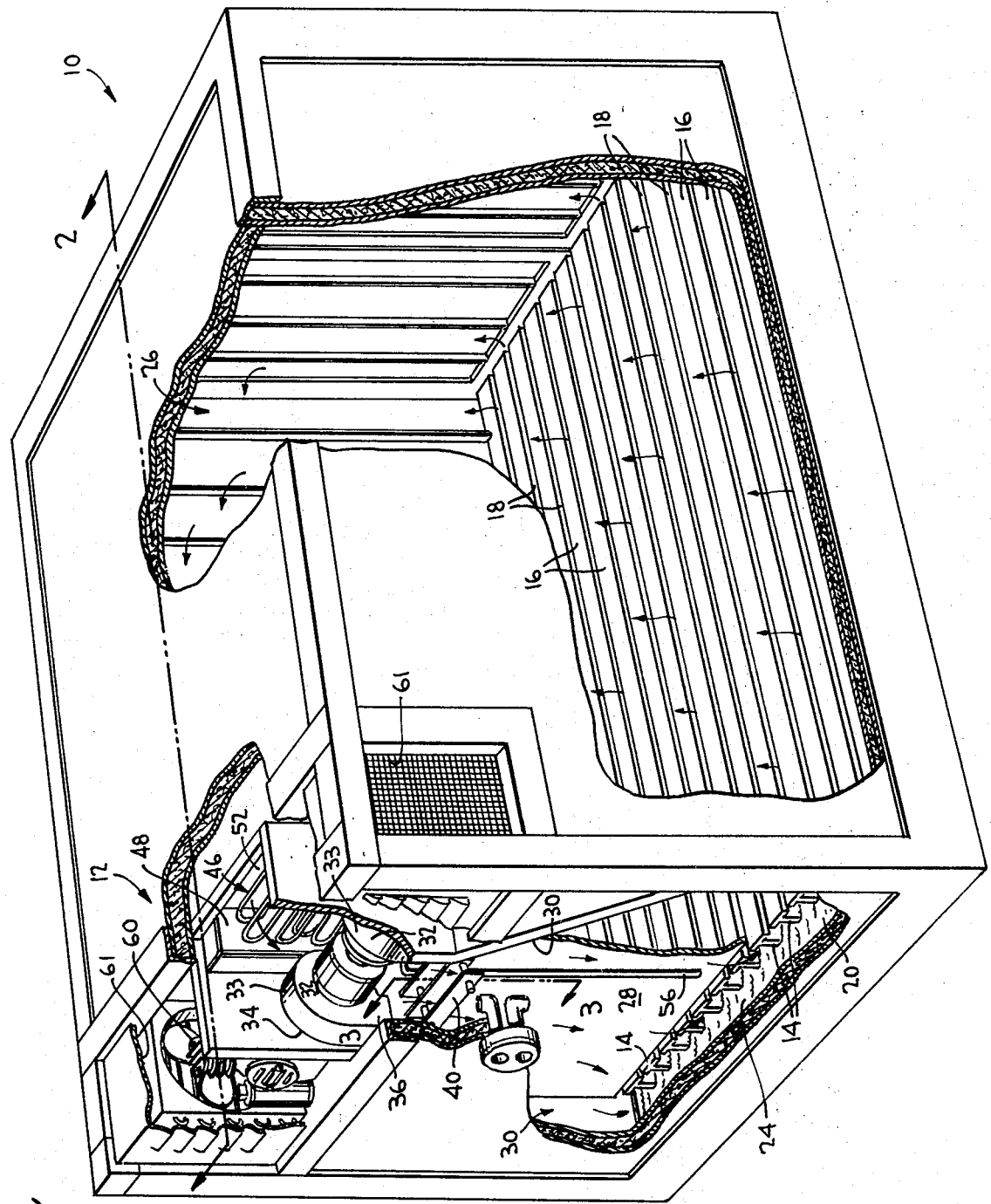
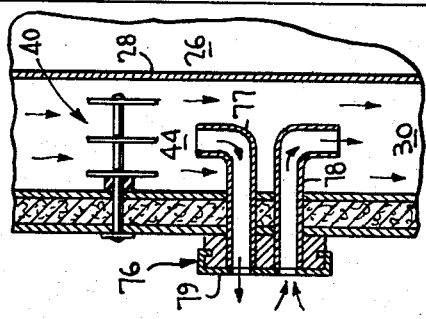
INVENTOR,
ERIC RATH
BY Samuel Meerkreebs
ATTORNEY INVENTOR,
ERIC RATH
BY Samuel Meerkrebs
ATTORNEY 3,521,459
METHOD FOR STORING AND TRANSPORTING FOOD IN A FRESH CONDITION
Eric Rath, P.O. Box 226, La Jolla, Calif. 92037
Filed June 21, 1968, Ser. No. 742,121
Int. Cl. F24f *3/16*
U.S. Cl. 62—78                                    1 Claim

ABSTRACT OF THE DISCLOSURE

A method of transporting fresh food products in an optimum condition and particularly adapted for use in modular shipping containers in which dual, complementary air cooling systems recirculating moist air through a storage compartment and about fresh food products without dehydration of the product by maintaining the moist air at a slightly lower temperature than optimum product transit temperature and eliminating decay promoting gases and/or while continuously sterilizing the moist air prior to movement into and through the product compartment.

---

The transportation of fresh agricultural food products, both of plant and animal origin in combined inland and sea service, has given rise to new problems. Heretofore when these products were shipped overland, the cargoes were confined to the interior of railroad cars or highway vehicles for a short period only. When shipped across oceans, the refrigerated ships carried large and heavy refrigeration plants on board with capacity to control the temperature and humidity with conventional elaborate cooling, ventilating and air conditioning equipment. With the increased demands on world food production, new areas not accessible to overland carriage are entered in to the food production field. Also, the high cost of ocean shipping and ship-to-sea cargo transfer requires cargo unitization by use of containers or vans. Space in these vans is too restricted to attach large conventional cooling and humidity control equipment to each container van. Yet with the extension of the trip duration, a more effective control method is required to preserve food quality and condition while in transit. Keeping food in unspoiled conditions also influences the cost of transportation since the value of the loss would have to be added to the remaining good portion of the arriving marketable cargo.

In conventional perimeter-cooling refrigeration systems, dry air is utilized causing continuous removal of moisture from the fresh products (fruits, vegetables or meats). There is relatively little versatility to accommodate for a wide variety of products and temperature and humidity ranges they require. Further, although optimum storage conditions might be designed aboard ship or stationary land cooling plants, the costs and size of such installations make them unattainable with present transport equipment. Thus present day food transportation and storage systems are in need of systematic improvements.

Objects of the present invention are as follows:

(1) To provide a novel method for preserving fresh food products in an optimum condition during all stages of transport by providing a controlled composite environment for long periods of time when transporting fresh products over long distances or from one continent to another;

(2) To provide a novel food product preserving system of the character mentioned above in which moist, cold air is constantly and uniformly circulated in a food storage compartment and the air is continuously sterilized to help maintain optimum environmental conditions;

(3) To provide uniform product temperatures and needed humidity throughout the cargo by circulating temperature-controlled moist air through and around all individual portions of the cargo so that relatively little change occurs in the product other than normal ripening or aging;

(4) To provide an air circulation about a transported product in which heat losses in the product and accompanying moisture losses by maintaining a temperature differential between the product and circulated air in the range of about .5° F. to 3° F. within the optimum product storage temperature while constantly recirculating moisture in the air so that moisture losses in the food product are minimized if not eliminated;

(5) To provide a novel food preservation system which lends itself to installation in standard-sized containers readily accommodated aboard ship, vehicular trailers, railroad cars and airplanes, and which is economical to install and operate, and which has the required versatility to accommodate a wide variety of food products at various temperature ranges, including frozen foods;

(6) To provide a novel method adaptable for use in all seasons and accommodated for temperature variations all over the world;

(7) To provide a novel method of exchanging the air being circulated around the product to eliminate the accumulation of undesirable gases being created by these products in their process of respiration.

These together with other objects and advantages of the invention will become apparent from a consideration of the following specification when taken in conjunction with the drawing forming a part thereof, in which:

FIG. 1 is a diagrammatic perspective view of a storage compartment with portions broken away showing the components for affording the novel method;

FIG. 3 is a fragmentary section taken on the plane of line 3—3 of FIG. 1;

Figure 2:
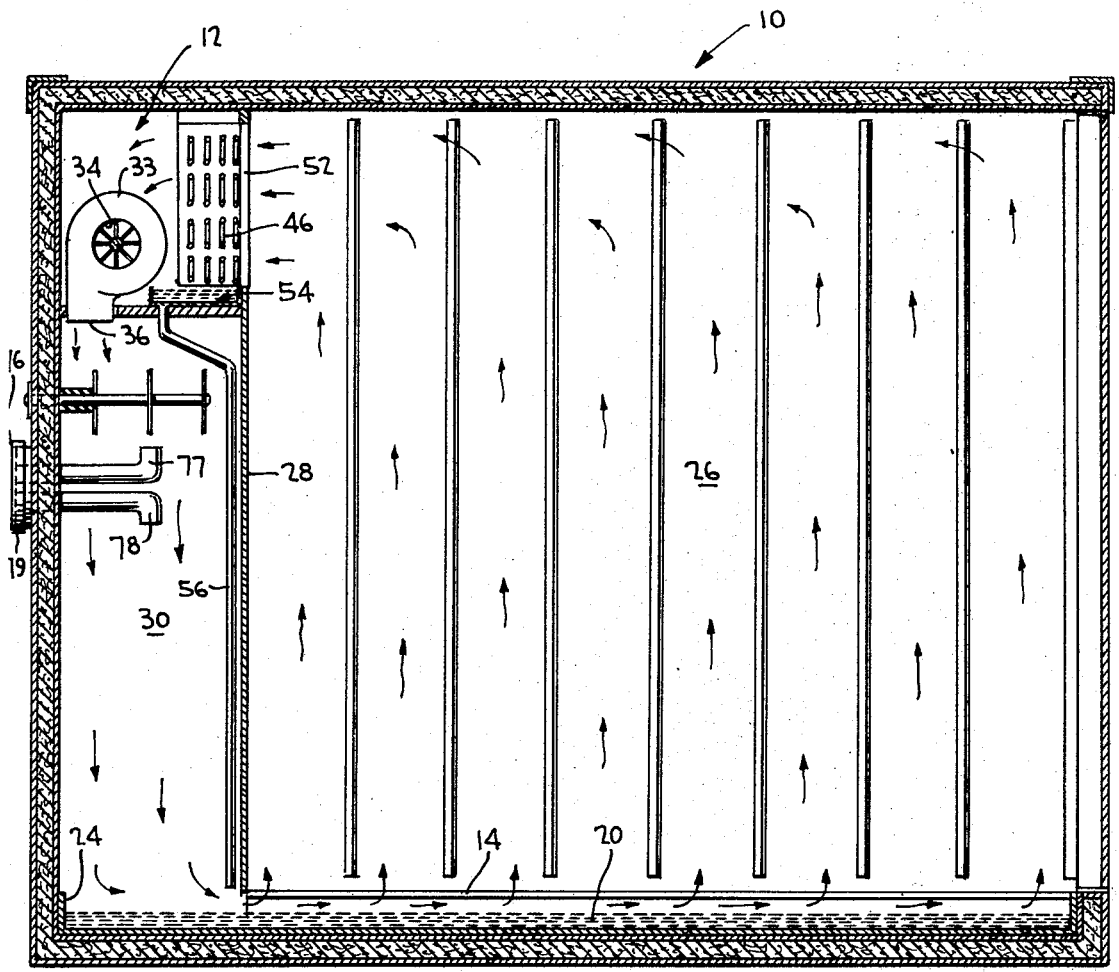
FIG. 2 is a vertical section taken on the plane of line 2—2 of FIG. 1.

Fresh food such as fruit, vegetables and/or meats generate heat as aging, maturing or ripening occurs and the generated heat results in moisture being driven out of the food product. The present method provides a moisture barrier slowing up heat generation in the product, reducing moisture losses, and permitting fruits and vegetables to be shipped in a more nearly ripe condition than was heretofore possible.

Referring to the drawings, a suitably insulated transport container with access doors (not shown) is indicated generally at 10 and has operatively connected thereto an air conditioning system 12.

The container 10 includes a plenum pressure chamber floor comprising a plurality of T-cross-sectioned floor forming elements 14, the upper horizontal flanges 16 of which being spaced from each other to form longitudinal slots 18.

A water pan portion 20 of the floor includes a portion 24 to maintain moisture therein. Vapor saturated air will constantly rise into the storage chamber 26 of the compartment 10 as a result of evaporation and/or the passage of pressurized air being circulated over portion 20.

The container 10 includes at one end thereof a vertical wall 28 forming a downwardly diverging plenum chamber or passage 30 which communicates at its lower end with the portion 24, i.e. the portion of floor 20 containing moisture.

The preferably electric powered air conditioning system 12 is a dual one having two independent condenser and evaporator sections which can be turned on or off on command from one or more thermostats (not shown) as required. This offers more dependability and a standby feature so important on long overseas trips. Further, after initial loading of the compartment 26, it is essential to eliminate relatively warm air as soon as possible. The dual system, at a relatively rapid rate brings the compartment 26 down to holding temperature, and thereafter only one of the blowers, etc. may be required to maintain the compartment temperature within critical limits. The dual system includes two blower assemblies 32, shown in the exemplary embodiment, as "squirrel cage" high-pressure blowers having housings 33 including axial inlets 34 communicating with the upper end of the compartment 26 for receiving air therefrom. The outlets 36 of the fan housings 33 communicate at their lower ends with an ozone generator 40 which supplies nacent or free oxygen to sterilize air being circulated to maintain bacterial growth at a minimum in the storage chamber 26. The chamber 30 extends into and transversely across the mouth 42 of the downwardly diverging ozone generator 40. Evaporator coils 46 upstream of the fan housing inlets 34, are enclosed by a suitable housing 48 having an opening 52 opening into an upper portion of chamber 26. The evaporator coils serve to maintain recirculated air at a temperature range from .5° F. to 3° F. within the average temperature required to maintain the food product stored in chamber 26 in an optimum condition.

A drip pan 54 is disposed beneath the evaporator coils 46 and communicates with a fluid line 56 whereby condensate on the coils 46 drops into the drip pan and then descends into the water pan portion 24 of the floor.

Referring to the drawings, see FIG. 1, the evaporator coils 46 are connected in series by a suitable return line connected to the inlet of respective compressors 60 located in isolated compartments 61 and the outlet of the compressors are connected to suitable pressure control valves, etc. The pressure control valves are connected to the inlet of a cooling coil through which air is driven by suitable blowers. Refrigerant is directed to conventional expansion valves by means of conduits connected to the outlet of the compressor cooling coil, and the expansion valves will be connected to the inlet of the evaporator coils 46. Connected to the compressor outlet lines and the cooling coils are suitable by-pass pressure control valves whereby a portion of the uncooled gas, i.e. compressed gas, is directed to the evaporated coils 46.

The compressors, compressor cooling coils, expansion valves, etc., for changing the refrigerating gases in the dual system from a gaseous to liquid state and removing heat are conventional.

The cooling system utilizes a conventional thermostatic control for the expansion valves, but the expansion valves will be located downstream of the air being drawn through the evaporator coil 46. The system of the present invention provides only relatively slight temperature differential between the air drawn from the chamber 26 and the air directed back into the chamber.

Conventional thermostatically controlled dry air cooling systems controlling operation of the expansion valves would usually utilize a thermostat *upstream* of the evaporator coil and thus reduce the temperature of the air considerably below the 3° F. advisable maximum differential found to be necessary and conventional systems oftentimes cause freeze damage of the food product or cargo.

Moist-air is the most prevalent gas mixture on earth. All human, plant and animal life is affected by moist-air. Moist-air is atmospheric air mixed with water vapor. Air itself is a complex mixture of at least a dozen different gases.

The composition of dry air remains constant with pressure and temperature changes. Water vapor is the gaseous form of water. Being the only gas which readily mixes in the same space with the air, it varies significantly with temperature changes. Therefore, the variance of water-vapor content in moist-air significantly affects both the thermodynamic properties and the moisture adsorbing capability of the mixture.

The composition of the molecular structure of fruits and vegetables showed that the best way to maintain the natural condition of these products was by means of proper moist-air cooling.

Forced-air cooling with dry air is the conventional method usually employed for transport refrigeration. Warm, moist-air from the product is forced across an evaporator coil, where most of the moisture is condensed out and drained out of the box or entrapped in the drain section of the cooling unit. The air leaving the evaporator coil warms up rapidly as it is delivered to the warm upper portion of the container, causing a proportionate rapid drop in its relative humidity. As the dried air moves downward through the load, it picks up both additional moisture and heat from the product. The result is a continuous dehydration and/or freezing of the product.

The present active moist-air system provides a steady flow of cooled air, saturated with moisture moving to and then through the load. Unlike conventional systems, the cold air from the evaporator coil travels downward and along under the load through the cold and wet forward duct and T-bar flooring elements 14 of the container. The air which is about 95% moisture saturated when leaving the cooling coil 46 warms only slightly in these passages; but this warming is not accompanied by a reduction in its relative humidity, because the air absorbs moisture from the water which has drained to the floor pan 20 from the evaporator coil 46. As a result, moisture saturated air is delivered to the product at the bottom of the load.

The present method maintains a slight temperature differential between the air temperature in the compartment 26 and the air being circulated and this is accomplished by regulating the pressure of the refrigeration gas which has a direct relation to the temperature being maintained. Further, instead of dehydrating the cargo, moisture is constantly re-introduced into the circulated air stream and in this manner maintains the cargo compartment in optimum environmental condition.

Electric heating strips (not shown) can be located within the evaporator coils 46 to serve as a source of heat as required by thermostat demand and also to supply heat for defrosting the evaporator coil as required. Contrary to conventional systems which cool the air as much as 20° F. lower than the product thus causing excessive dehydration, the present method maintains the cargo temperature substantially within plus or minus 1.5° F. of the desired level thus maintaining high humidity levels in the cargo compartment.

As soon as the air leaves the power blower system, the friction will cause it to lose some of its new increased static pressure. Also, since it leaves the cooling coils at the same time, it has now reached its highest vapor saturation point for this given temperature. With the friction on the downward duct, the turning vane and the pressure-plenum chamber in the T ducted floor of the container, the air, however, has warmed itself up somewhat and thus is now capable of absorbing additional moisture.

This second phase of conditioning of the moist air is done in the T floor duct connected directly to the cooling machinery unit in the front part of the container. By metal-to-metal contact, the metal T floor 14 transmits and stores a large portion of the cold produced by the cooling machinery thus providing a larger cooling, in effect, than conventional refrigeration units.

Forced, moist-air cooling must overcome static resistance created among the small open air channels of the fruit and vegetable cargo, and maintain a high level of pressure-differential in the air stream during the entire period of cooling activity. Also, cargo penetration requires natural convection of the moist-air, enabling the stream to better surround each layer of product with saturated vapor.

Moist air is a "non-ideal" gas which does not conform to the commonly known rules and laws of physics for "perfect gases." Conventional in-transit refrigeration systems use the perfect gas rules and as a consequence, the wrong assumptions have led to the design of equipment which cannot by its very nature accomplish the large range combined control of temperature, humidity and bacteriological growth. The present equipment has used field testing to establish the analytical basis from which the design criteria have been drawn, to produce the vapor pressure, relative humidity and degree of increasing saturation of the dry air to produce the moist air required.

Inertia, or resistance to change of velocity being an inherent property of the air mass, is being overcome in this present system by channeling the moist air in to the plenum chambers which make up the T section floor. Each of these plenum chambers is enclosed on all sides except on the top. This, in a sense, provides a plurality of plenums of ¾ inch high per each 10' of container van length plenum. A minimum of 50 cubic feet of air per minute must be pressed under a minimum pressure of 1½" (water gauge), to produce the gravitational force required to overcome the inertia of the moist air mass. The continuous delivery of so-conditioned air mass makes the air located in the floor escape upward through the 1" wide slot on top of each pressure plenum. The force produced by the 2 power blowers produces a vector motion in the moist air enclosed in each of the plenum chambers and makes it rise in right angle to the air delivery stream. Thus acting as a pressure accumulator, the present pressure plenum chamber arrangement of the T floor not only provides the change of momentum of the moist air now beginning to rise from the floor, but also the acceleration force to carry this moist air stream through the cargo stacked on top of the floor.

While conventional systems require the air to pass through long distance back-to-front of the cargo, the present system uses the shorter run from top-to-bottom of the cargo which seldom exceeds 8' and does it acting under forced acceleration. This floor plenum, as the coldest part of the container, will act as a water pan at all times, holding a deposit of water. The air must cross over this water, under pressure, and thus picks up as much water content as its maximum degree of saturation will permit at this point.

In the third sequence, the moist air is then forced into the cargo product from bottom to top under pressure. This moist air, fully vapor-saturated, reaches the bottom layer of the cargo product where it cools the product without extraction of moisture from the product, since the air is now almost unable to absorb more moisture from the product.

As the air stream passes next upward to the second and following layers of the product, it always carries most of the moisture brought from the original waterpan and augmented by some of the moisture removed from the product layers. Consequently, in a continuous chain, the air remains saturated with moisture as it is conducted from one layer to the other by the air stream rising from bottom to top.

Finally, upon leaving the uppermost level of the cargo, the air stream returns horizontally above the cargo to the heat exchanger. Moisture in the air condensing out as it passes through the cooling coils 46 is immediately returned to the floor of the container, traveling down the discharge air duct, thus closing the cycle. The activated vapor method maintains moisture throughout the air distribution system and the load. Conventional cooling systems continuously remove moisture from the cargo, entrap the moisture, and never return it to the load.

By constantly circulating moist air at optimum temperature throughout the entire cargo, within the optimum temperature range differential, generation of heat by respiration of the food product is slowed down thus reducing the refrigeration load.

In the present method, the air cooling unit may be described as a minimum cycle, constant pressure system which maintains a .5–3° F. temperature differential across the evaporator coil only slightly lower than the optimum cargo temperature. In this system, a more uniform cargo temperature is maintained and dehydration is substantially eliminated. Further, the present system is very efficient since by reducing the amount of condensate on the evaporator coil, as compared with conventional systems involving a drastic temperature reduction, requires less horsepower since less B.t.u.'s of heat must be removed by the refrigeration system.

Figure 4:
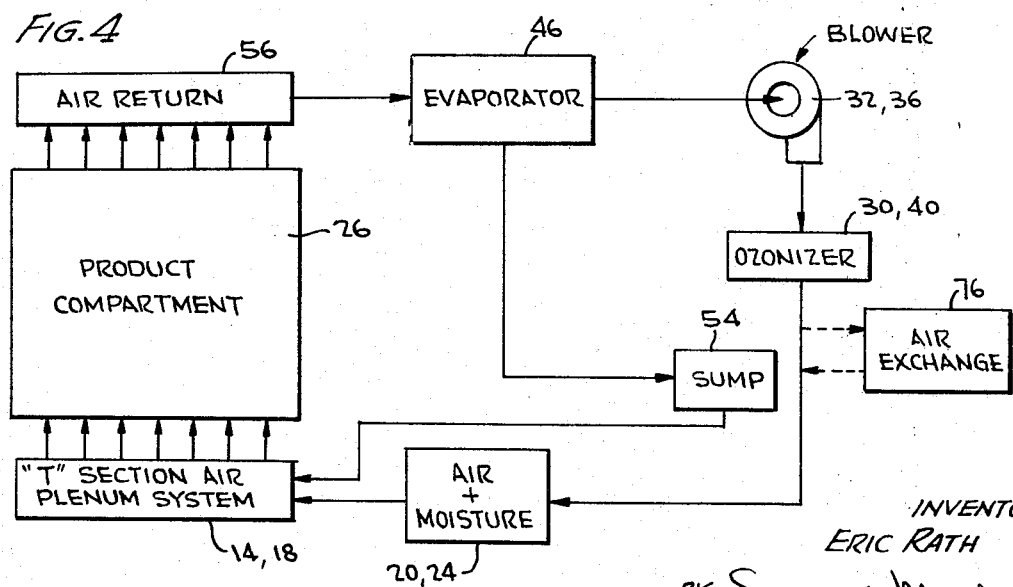
FIG. 4 is a block diagram illustrating the components effecting the novel method.

Referring to FIG. 4, and as previously explained, air slightly chilled, but yet in a substantially moisturized condition, i.e. to the physical limit of its water absorption capacity, passes downwardly through plenum chamber 30. Upon reaching the floor 20 where excess moisture condensed off coils 46 is located, the air temperature which has risen a slight degree, will take on additional moisture, once to the physical limit of its water absorption capacity.

Next, as the air is forced upwardly by the fan pressure it contacts the fresh product, i.e. fruit, vegetables, meats, etc.

As the air rises in compartment 26, it contacts the outer surface of the product regardless of the type of container, etc. in which the product is packaged or packed. The only requirement for the container is that it cannot be moisture impervious. As the moist air rises, it takes on an increased temperature and this develops a physical ability to become more moist. Upon contacting the product, containers, etc., and due to its increasing temperature, an actual moisture exchange occurs at the surface of the product.

It will be recalled that the temperature differential range is maintained within .5° F. to 3° F. of the optimum preserved product temperature, therefore the moisture exchange at the product surface or skin is infinitesimal, yet serves to prevent moisture losses in the product. This results in a product, i.e. fresh produce, which is vapor sealed to maintain its optimum fresh appearance, normal ripening can continue, and deleterious gas promoting decay are removed with the air stream, and harmful bacteria are either destroyed, carried off or at least rendered inactive.

Figure 5:
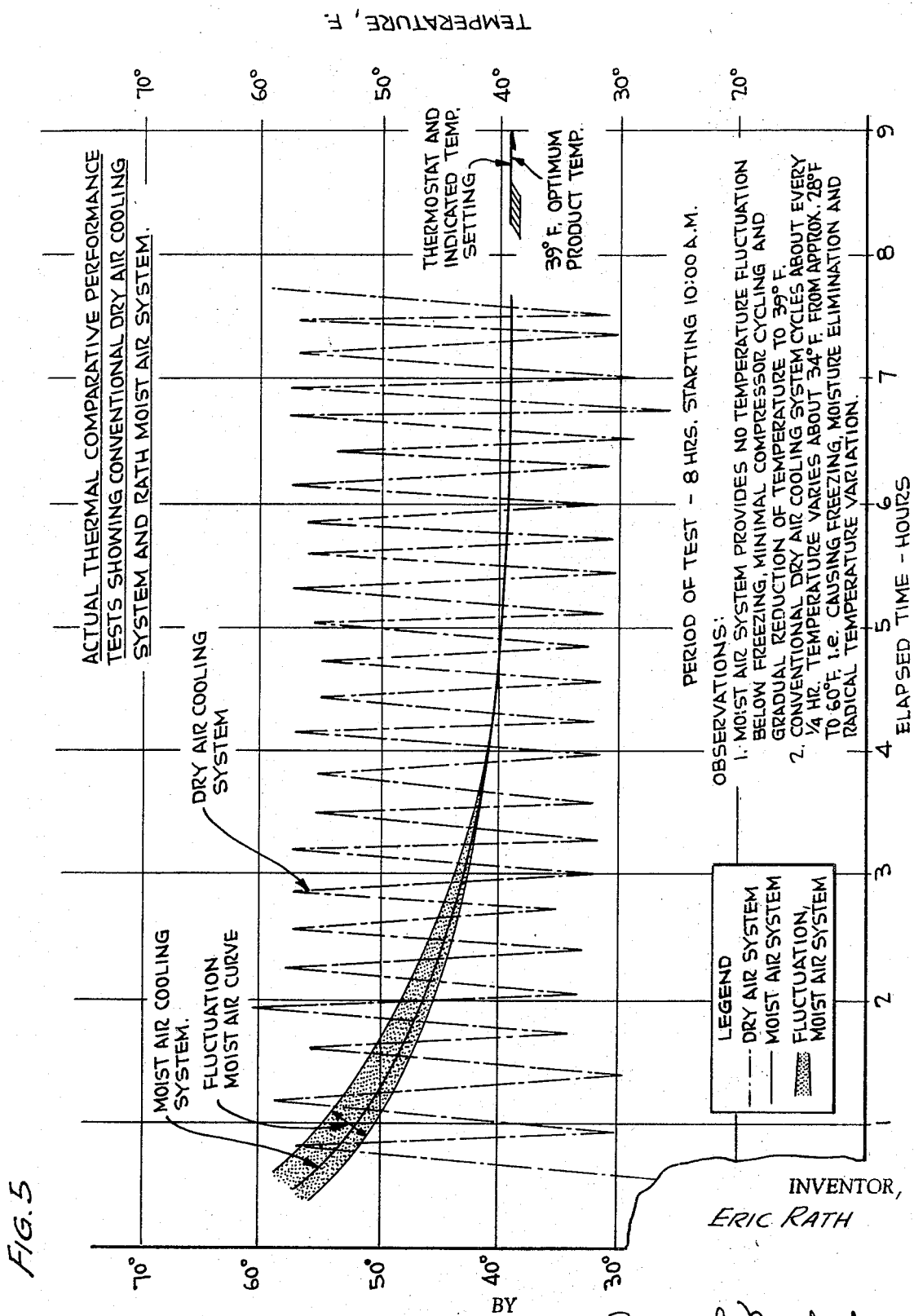
FIG. 5 is a comparative thermal performance graph plotting temperature fluctuations in a conventional dry air system and a moist air system of the invention.

Referring to FIG. 5, an actual comparative performance graph is illustrated. The horizontal coordinate shows the time lapse over a range of 0 to 8 hours. The vertical coordinate illustrates temperature in 0° F.

The dotted line fluctuating between approximately 30° F. (below freezing) and 60° F. shows the manner in which a conventional cooling (and/or freezing) system functions during shipment of fresh produce.

The solid line (shaded on each side to show a .5° F.– 3° F. differential) illustrates the manner in which the method of the present invention functions.

Where the optimum produce temperature was intended to be maintained at approximately 39° F., the temperature curve using the method of the present invention, gradually reduced the compartment temperature with erratic cooling and then heating (accompanied by dehydration) as shown in dotted lines, thus requiring minimum effort or load on the cooling system, while yet ending up with produce which was never subjected to extreme dehydration and excessively low freezing temperatures.

Further, it will be noted, at the 8th hour, that the conventional system is still cycling at a range between about 30° F. to 50° F.

Fresh fruit and vegetables are alive. Meat is dead. But both do respire giving off heat and gases. This heat and gas combination must be eliminated in order to prevent deterioration. Accordingly, a ventilation or air exchange assembly 76 is provided. The assembly 76 includes an outlet pipe 77 opening upstream in plenum 30 and air inlet pipe opening downstream in plenum 30. The pipes 77 and 78 extend through the end wall of compartment 10 and a multi-apertured, rotatable disc 79 controls the openings. Air is forced into pipe 77 and passes out of compartment, and fresh air is drawn in through pipe 78.

Further, since one of the major causes of in-transit spoilage is caused by decaying-bacteria present in the air and on the surface of the food product, the breeding of decay-causing organisms and bacteria is substantially reduced and/or eliminated by sterilization through use of an ozone generator 40, whereby free oxygen molecules are available to wash or sterilize the circulated air whereby the tolerable level of life of decay-causing organisms and/or bacteria is exceeded and the organisms are destroyed and do not continue to breed; thus the shelf life of the perishable food products is substantially extended.

The maintenance of a highly concentrated moist-air atmosphere is of paramount significance. The high vapor-pressure and high humidity level maintained in the storage chamber during transit affords the following advantages and results:

(1) Loss of weight in the product due to moisture losses is at a minimum;

(2) product breakdown or decay through oxidation is prevented by maintaining fluids in the product cells or passages, thus preventing internal oxidation within the product;

(3) A temperature balance is maintained by the delivery of high vapor content air and different products are not subject to being flavored by other products;

(4) The concentration of water vapor in the circulated air results in a lighted air mass being moved affording better cargo penetration as well as less load on the air movement and refrigeration compartments;

(5) A higher degree of humidity in the circulated air aids to balance the evaporator coil temperature and that of the cargo to maintain a minimum temperature differential.

The condensate water which accumulates in the drip pan or in the T floor will be absorbed by this slightly warmed air providing a higher relative humidity to the air. For example, if two fans are used and move 6000 cubic feet of air at 1½" static pressure, the air heated through fan blade movement will increase the heat content by about 10% from 7.72 B.t.u./lb. at 32° to about 10.14 B.t.u./lb., and this in turn would result in a change of air density from about .810026 lb./cubic ft. to .796243 lb./cu. ft. at a temperature of about 35° F.

Briefly, to review the objects of the invention, they are as follows:

(1) To maintain a uniform product temperature level throughout a cargo storage area;

(2) To distribute moist air through a cargo storage area depending on product requirements;

(3) To replace stale or gas-saturated air with fresh air in the cargo storage area;

(4) To control mold and bacterial growth through the use of sterilization, i.e. by using nascent oxygen;

(5) Eliminating dehydration by maintaining low vapor-pressure differential between the cooling coil and the product;

(6) Maintaining cargo temperatures within plus or minus 3° F. of thermostat setting at any desired level between 28° and 70° F. for various produce; and (7) To afford optimum cargo penetration by circulating air with a high-humidity level throughout a storage compartment.

In FIG. 5 elapsed time is plotted vs. temperature in ° F. starting at approximately 60° F. within .5° F.–3° F. the moist air system of the invention gradually reduces the temperature over an 8 hour period in gradual solid line curve with minimum loads on the cooling coils and associated components. In the dry air system, illustrated by dot-dash lines, the temperatures are radically reduced (below freezing) then become elevated, so that the product is subjected to extreme and radical conditions as well as resulting in overworking of the dry air cooling system.

It will be obvious to those skilled in the art that various changes may be made without departing from the spirit of the invention and thus the invention is not limited to what is shown and described in the specification but only what is set forth in the accompanying claim.

What is claimed is:

1. The method of maintaining fresh produce in an optimum fresh condition in storage, comprising the following:

(A) placing fresh produce in a storage chamber, all of said produce being maintained at an elevation above the bottom of said chamber, said chamber being interconnected with an air treatment system;

(B) providing a moisture zone between the lowest level of said produce in said chamber and the bottom of said chamber;

(C) circulating air from said air treatment system through said moisture zone and upwardly therefrom about said produce in said chamber, in which said air has been humidified, cooled, sterilized, and freshened by forced air system in the following steps:

(1) air is exhausted from the upper portion of said storage chamber;

(2) said air exhausted from said upper portion of said storage chamber is passed through a cooling zone with condensate resulting from said cooling being passed to said moisture zone;

(3) said cooled air is treated with ozone for sterilization in a sterilization zone after passing through said cooling zone;

(4) a portion of said cooled and sterilized air is removed from the air treatment system and replaced with a portion of air from outside said air treatment system after said cooling and sterilization;

(5) said portion of air from outside said system is intermixed with the remaining cooled and sterilized air remaining in the system;

(6) thereafter, said mixture of air is introduced into said moisture zone; and (D) the process of circulation as set forth in step (C) above is continued during continued storage of said produce.

References Cited

UNITED STATES PATENTS

| | | | |
|---|---|---|---|
| 1,846,875 | 2/1932 | Karr | 62—91 |
| 1,949,381 | 2/1934 | Showers | 62—418 |
| 1,965,078 | 7/1934 | Hewitt | 62—91 |
| 2,065,358 | 12/1936 | Zarotschenzeff | 62—91 |
| 2,123,678 | 7/1938 | Inadden | 62—418 |
| 2,130,430 | 9/1938 | Inaginnis | 62—78 |
| 2,162,923 | 6/1939 | Short | 62—418 |
| 2,298,896 | 10/1942 | Meyer | 62—418 |
| 2,339,507 | 1/1944 | Nagy | 62—418 |
| 3,412,571 | 11/1968 | Bolynn | 62—91 |

WILLIAM J. WYE, Primary Examiner

U.S. Cl. X.R.

62—85, 91, 264, 322, 418, 419